Figure 1:
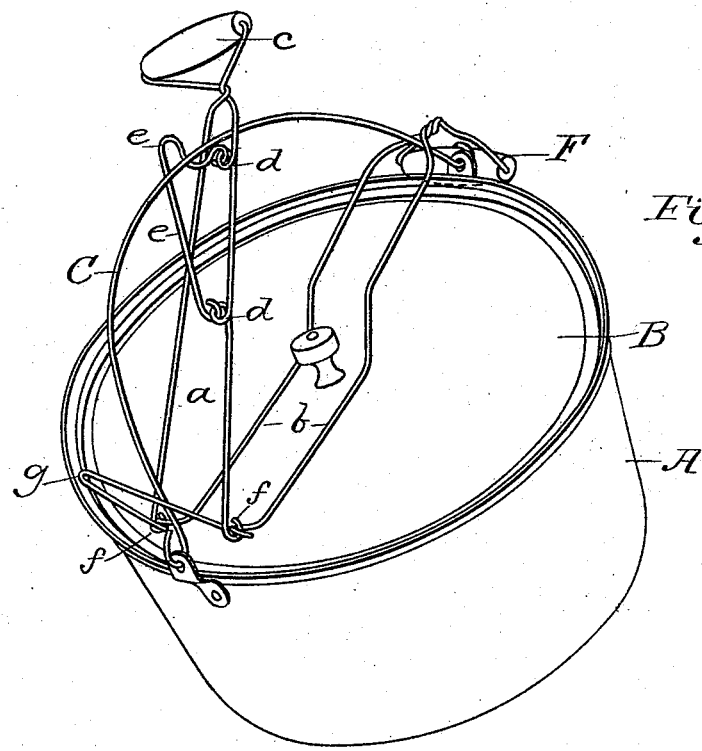

(No Model.) 2 Sheets—Sheet 1.
H. A. SCHERMERHORN.
COVER HOLDER FOR CULINARY POTS OR KETTLES.

No. 572,774. Patented Dec. 8, 1896.

Witnesses.
Wm. M. Rheem.
M. B. Dean.

Inventor.
Herschel A. Schermerhorn
by F. D. Thomason Att'ys (No Model.) 2 Sheets—Sheet 2.
H. A. SCHERMERHORN.
COVER HOLDER FOR CULINARY POTS OR KETTLES.
No. 572,774. Patented Dec. 8, 1896.

Witnesses.
Wm. M. Rheem
M. B. Dean

Inventor
Herschel A. Schermerhorn
by
F. D. Thomason, Atty.

United States Patent Office.

HERSCHEL A. SCHERMERHORN, OF WATERMAN, ILLINOIS.

COVER-HOLDER FOR CULINARY POTS OR KETTLES.

SPECIFICATION forming part of Letters Patent No. 572,774, dated December 8, 1896.

Application filed April 1, 1896. Serial No. 585,682. (No model.)

*To all whom it may concern:*

Be it known that I, HERSCHEL A. SCHERMERHORN, a citizen of the United States, and a resident of Waterman, De Kalb county, Illinois, have invented certain new and useful Improvements in Cover-Holders for Culinary Pots or Kettles, of which the following is a full, clear, and exact description, reference being had to the accompanying drawings, and to the letters of reference marked thereon.

Heretofore housekeepers and cooks have experienced considerable difficulty in emptying the hot and steaming liquor in which vegetables or other articles of food have been cooking, and oftentimes have scalded and burned themselves while so employed.

The object of my invention is to avoid this difficulty entirely. This I accomplish by means of two hinged arms, which when opened between the cover and bail of a pot or kettle keep the former securely in place, no matter how the pot or kettle is manipulated, and at the same time give the operator a perfect hold of the vessel, substantially as hereinafter fully described, and as illustrated in the drawings, in which—

Figure 2:
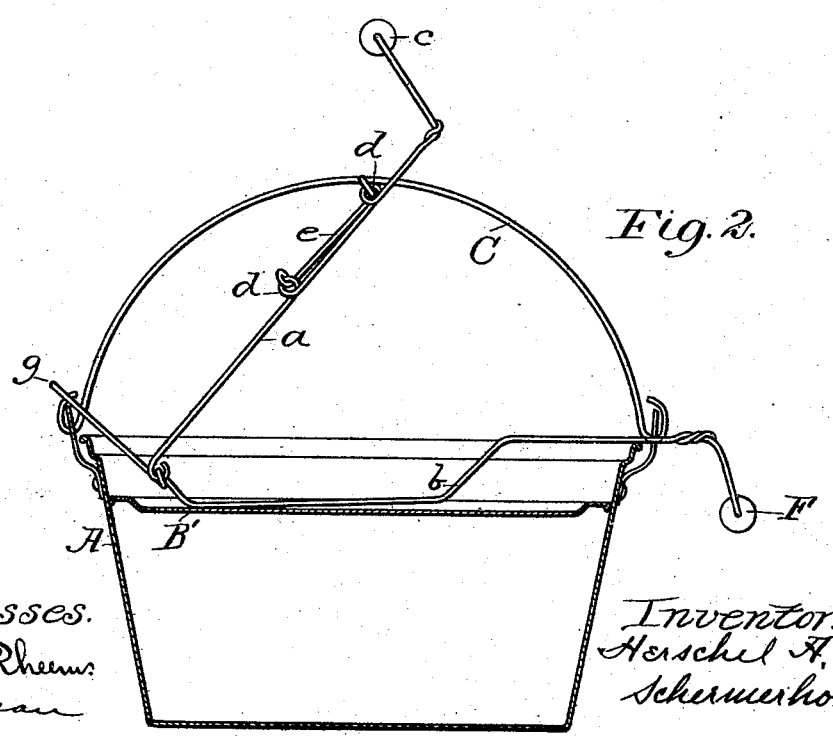
Figure 3:
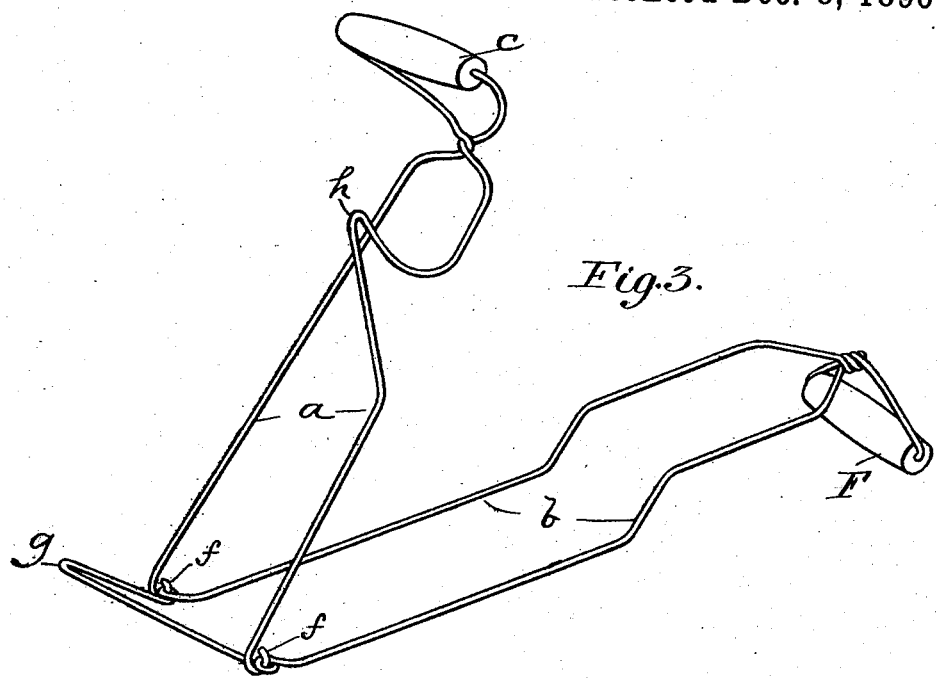
Figure 4:
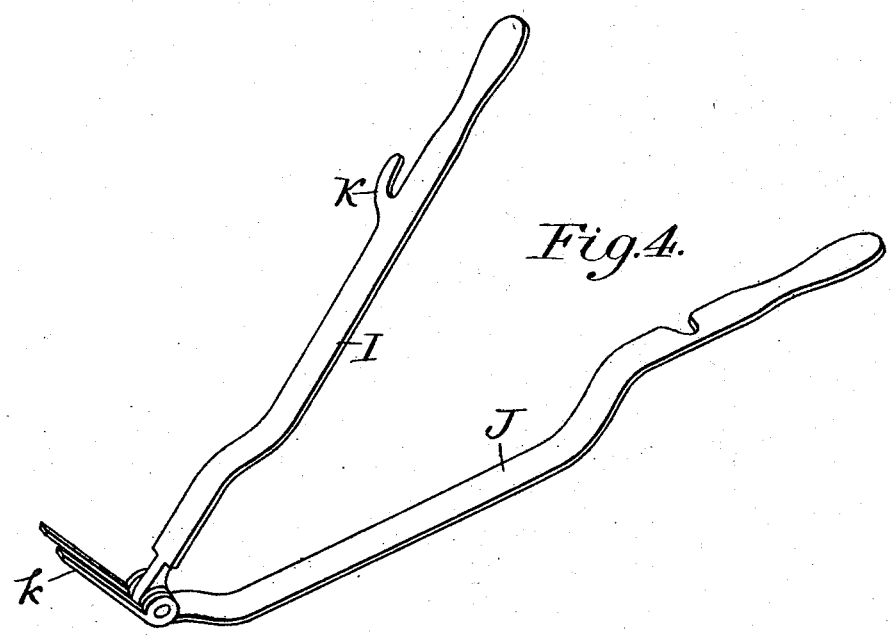

Figure 1 is a perspective view of a kettle, showing my improved cover-holder applied thereto. Fig. 2 is a vertical central section through said kettle with the cover set down into the same and held by my cover-holder. Fig. 3 is a perspective view of a modified construction of my invention, and Fig. 4 is a perspective view of yet another modification.

In the drawings, A represents the kettles. B represents the cover, and C represents the bail. The cover B (shown in Fig. 1) is of such diameter that it rests upon the edges of the kettle, whereas the size of the cover B' in Fig. 2 is such that it drops down into the kettle and rests on its contents.

As is well known, covers for culinary kettles are of different sizes and are interchangeably used. A device for holding the cover in place while draining the water or liquor therefrom should adapt itself to hold said cover no matter what position in or on the kettle it occupies.

My invention, as shown in the first two figures of the drawings, consists of two arms $a$ and $b$, hinged together at one end. These arms are both made of wire, the upper one consisting of two wires of about corresponding length, twisted together near one end and then branching out and their extremities entering the ends of and supporting a handle $c$. The remainder of the wires of this upper arm are substantially parallel, and are alike, excepting that one of said wires is provided with two eyes $d\ d$ about midway its length, to which are hinged the ends of the acute-angle-shaped wire fly $e$. The side of this fly $e$ nearest the handle is arranged substantially at right angles to the sides of the arm, and the projection or length of this side of said fly is such that the angle thereof will, when in the position shown in Fig. 1, rest upon the companion wire of that to which it is hinged. The ends of the wires of which the upper arm $a$ is constructed coming opposite the ends to which the handle is attached are looped or bent to form knuckles, which are hinged to the eyes $f$ of the lower arm $b$.

The lower arm $b$ of my improved holder is, as shown in said Fig. 1, constructed of one wire bent double. The branches of the wire from its bend gradually separate, until they are about the same distance apart as the wires of the upper arm, so as to form a toe $g$, and about three inches from said bend said branches are provided with the eyes, hereinbefore alluded to, to which the upper arm is hinged. About where the eyes $f$ are located the branches of the wire are bent so that the toe $g$ is at an obtuse angle to the remainder of the length of the arms $b$. If desired, these same branches may be correspondingly bent upward at a point about opposite the fly $e$, and at a point yet nearer their ends they are twisted together and then branched out and their extremities inturned, so as to enter the bore of the handle F.

In operation I first place the bail of the kettle as near vertical as possible, then, bringing the two arms of my holder together, slip the holder over the bail, so that the latter projects up between the branches or side wires of the same, and then I swing said fly so that its nose rests on the opposite companion wire, and then, grasping the handles, spread the arms apart. When spread apart a suitable distance, the fly $e$ of the upper arm will bear outward against the bail and the lower arm will press against the cover, so that a good hold of the kettle will be secured and at the same time the cover held securely in place. When the cover sets down into the kettle, as shown in Fig. 2, the angle of the toe of arm *b* permits the fulcrum or hinge of the two arms to dip down into the kettle, so that when the arms are spread apart the formation of the lower arm enables it to press against the cover.

If desired, the handles of each arm may be bent away from each other, so as not to interfere, substantially as shown.

In Fig. 3 I show a modified construction of my invention, which, however, differs from the holder shown in the first two figures of the drawings only so far as the fly *e* is concerned. In this modification instead of a fly *e* I have bent one of the wires of the upper arm laterally, so as to make a transverse finger *h*, the end or angle of which reaches over the companion wire of said arm, but in its normal position is separated therefrom about half an inch. When using the holder having this transverse finger, the holder when applied to a kettle is turned or inclined toward one side, so that the bail can pass between said finger and the side wire of the arm contiguous to its end and is then turned to its proper position again and the arms spread apart, so that the bail of the kettle is caught by said finger. When removing this modified holder, it is inclined toward its side to release the bail.

In Fig. 4 of the drawings I show yet another modification of my invention. In this construction I make the upper and lower arms I and J of solid strips of metal of sufficient dimension to withstand the pressure to which they are subjected. I give the lower arm J substantially the same curvature as that shown in Figs. 1 and 2, excepting that it has a bifurcated portion extending beyond its pivotal point. This extension *k* is intended to pass on either side of the bail or ear of the kettle when using the holder. The upper arm I of this modification is deflected to one side a short distance from its pivotal end and at a point nearer its handle is provided with a hook-shaped finger K. In use this hook-shaped finger catches under the bail and operates the same as the holders heretofore described.

There may be other modifications or changes of construction made in my invention than hereinbefore described. All such changes, however, which involve the use of two arms connected or articulated so as to be capable of being spread or opened apart and having such a construction as to be pressing in opposite directions on the cover and bail of the kettle or pot at the same time I consider as coming within the scope of my invention.

What I claim as new is—

1. A cover-holder for pots and kettles consisting of two arms each made of two substantially corresponding branches or lengths of wire, the wires of the upper being hinged to the wires of the lower, and having one of said wires provided with a lateral device which reaches over the other wire thereof, as and for the purpose specified.

2. A cover-holder for pots and kettles consisting of two arms each made of two substantially corresponding branches or lengths of wires, the wires of the upper arm being hinged to the wires of the lower arm, and having one of said wires provided with a lateral device which reaches over the other wires thereof, and the wires of the lower arm extending beyond the point of articulation at a suitable angle and forming a suitable toe, as and for the purpose specified.

HERSCHEL A. SCHERMERHORN.

Witnesses:
SAMUEL E. THOMASON,
FRANK D. THOMASON.